United States Patent
Uryu et al.

(12) 
(10) Patent No.: US 6,729,433 B2
(45) Date of Patent: May 4, 2004

(54) ELECTRICALLY-POWERED STEERING DEVICE

(75) Inventors: Nobuhiko Uryu, Kariya (JP); Hideyuki Hayakawa, Nishio (JP); Kenji Morikawa, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/316,050

(22) Filed: Dec. 11, 2002

(65) Prior Publication Data
US 2003/0116376 A1 Jun. 26, 2003

(30) Foreign Application Priority Data

Dec. 21, 2001 (JP) ........................ 2001-389060
Sep. 25, 2002 (JP) ........................ 2002-278589

(51) Int. Cl.$^7$ ............................................. B62D 5/04
(52) U.S. Cl. ........................................ 180/444; 310/71
(58) Field of Search ............................. 180/443, 444; 439/34, 76.2; 310/71

(56) References Cited

U.S. PATENT DOCUMENTS 5,732,790 A * 3/1998 Endo et al. .................. 180/444
5,988,005 A * 11/1999 Onodera et al. ............ 74/388 PS
5,993,268 A   11/1999 Yamaguchi
6,123,167 A * 9/2000 Miller et al. ................ 180/444
6,211,631 B1 * 4/2001 Wilson-Jones et al. ....... 318/12
6,429,553 B1 * 8/2002 Taniguchi et al. ........... 310/67 R
6,622,814 B2 * 9/2003 Kurokawa et al. ............ 180/444

FOREIGN PATENT DOCUMENTS

JP   8-164861   6/1996
JP   10-12309   1/1998

* cited by examiner

Primary Examiner—Daniel G. DePumpo
(74) Attorney, Agent, or Firm—Posz & Bethards, PLC

(57) ABSTRACT

An automotive electrically-powered steering device is provided which is easy of assembly and electric connections. The steering device includes an electric motor, a motor torque transmission mechanism, a torque detector, and a motor controller which are arranged integrally as a unit. The controller includes a motor driver and a control substrate to which terminals of the motor driver are connected electrically. A steering shaft passes through a portion of the control substrate. The electrical terminals of the motor, the torque detector, and the motor driver extend in an axial direction of the steering shaft and connect electrically to the control substrate from the same side.

6 Claims, 8 Drawing Sheets

ELECTRICALLY-POWERED STEERING DEVICE

BACKGROUND OF THE INVENTION

1. Technical Field of the Invention

The present invention relates generally to an electrically-powered steering device which may be employed in automotive vehicles.

2. Background Art

Japanese Patent First Publication No. 8-164861 discloses a conventional electrically-powered steering device which consists of an electric motor linked to a steering shaft through a torque transmission mechanism, a torque detector measuring torque added to the steering shaft, and a motor controller controlling an output of the motor as a function of the measured torque. The motor, the torque detector, and the motor controller are installed integrally on a steering column.

The above steering device, however, has the drawback in that the motor, the torque detector, and the motor controller are placed around the steering shaft from different directions and assembled as a unit, therefore, the assembling is quite inconvenient. Particularly, orientations of electric terminals joined to the control substrate are different, thus resulting in complicated joints between the terminals and the control substrate and increase in manufacturing cost.

SUMMARY OF THE INVENTION

It is therefore a principal object of the invention to avoid the disadvantages of the prior art.

It is another object of the invention to provide an improved structure of an electrically-powered steering device which is easy of assembly and electrical connections between electric parts of the steering device and a control substrate.

According to one aspect of the invention, there is provided an electrically-powered steering device which comprises: (a) a motor working to produce torque for assisting an operator in turning a steering wheel; (b) a torque transmission mechanism working to transmit the torque outputted by the motor to a steering shaft linked to the steering wheel; (c) a torque detector working to measure torque acting on the steering shaft; and (d) a controller working to control an output of the motor as a function of the torque measured by the torque detector. The motor, the torque transmission mechanism, the torque detector, and the controller are arranged integrally as a unit. The controller includes a motor driver which controls an exciting current supplied to the motor and a control substrate to which terminals of the motor driver are connected electrically, the control substrate being installed so that the steering shaft passes through a portion of the control substrate. The power terminals of the motor, terminals of the torque detector, and terminals of the motor driver extend in an axial direction of the steering shaft and connect electrically to the control substrate from the same side.

The steering shaft, as described above, passes through the control substrate. Specifically, the control substrate traverses the steering shaft. This provides for ease of the electrical connections of all the terminals to the control substrate.

In the preferred mode of the invention, the motor, the torque transmission mechanism, the torque detector, and the controller are constructed coaxially with the steering shaft, thereby allowing the steering device to have a compact structure as a whole, thus resulting in improved mountability of the steering device on vehicles.

The torque transmission mechanism may be implemented by a speed reduction gear mechanism using one of a worm gear and a hypoid gear which works to increase the torque outputted by the motor and transmit it to the steering shaft, thereby permitting the size of the motor to be decreased.

The torque transmission mechanism may also be implemented by one of a planetary gear speed reduction mechanism and a wave gear speed reduction mechanism, thereby permitting the torque transmission mechanism to be constructed as a whole coaxially with the steering shaft.

The torque detector is made up of a magnet and a magnetic sensor.

The torque detector is disposed in close proximity to a periphery of the steering shaft. Specifically, the torque detector is located apart from an external magnetic field, thus minimizing an error in operation thereof caused by the magnetic field.

BRIEF DESPCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

DESCRIPTION OF THE PREFERRED EMBODIMENTS

Figure 1:
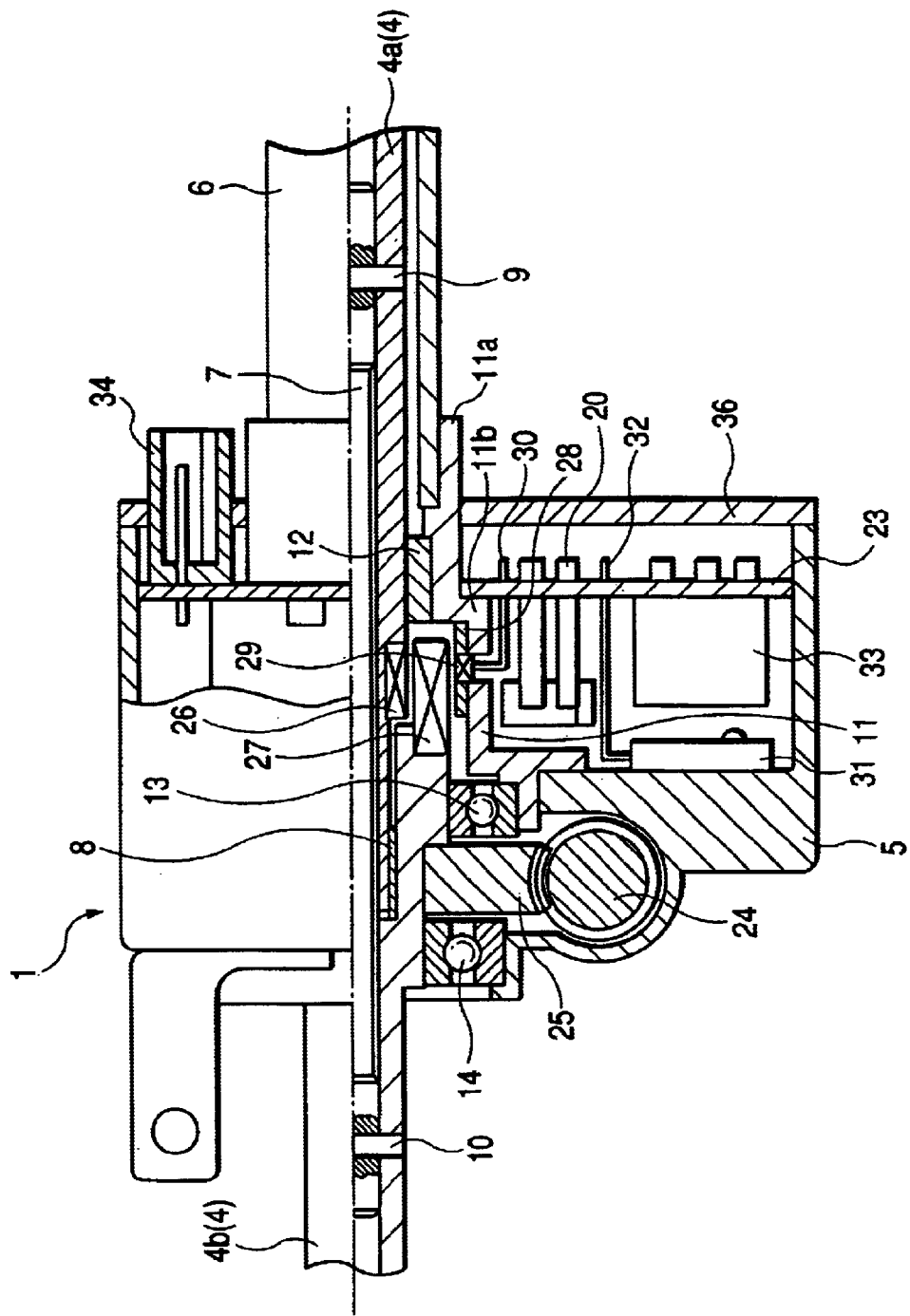
FIG. 1 is a partially longitudinal sectional view which shows an electrically-powered steering device according to the first embodiment of the invention.
Figure 2:
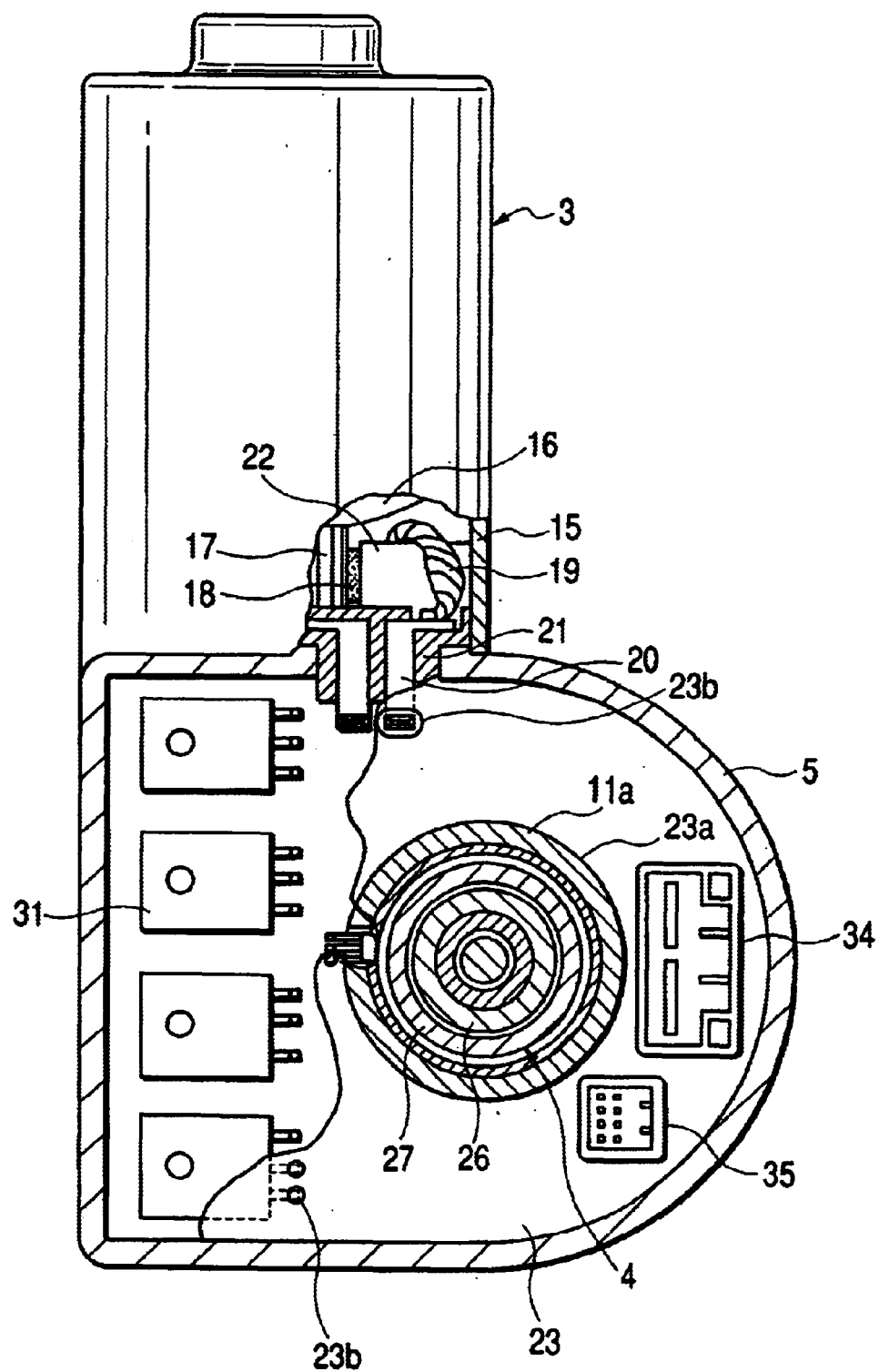
FIG. 2 is a partially transverse sectional view which shows the electrically-powered steering device of FIG. 1.
Figure 3:
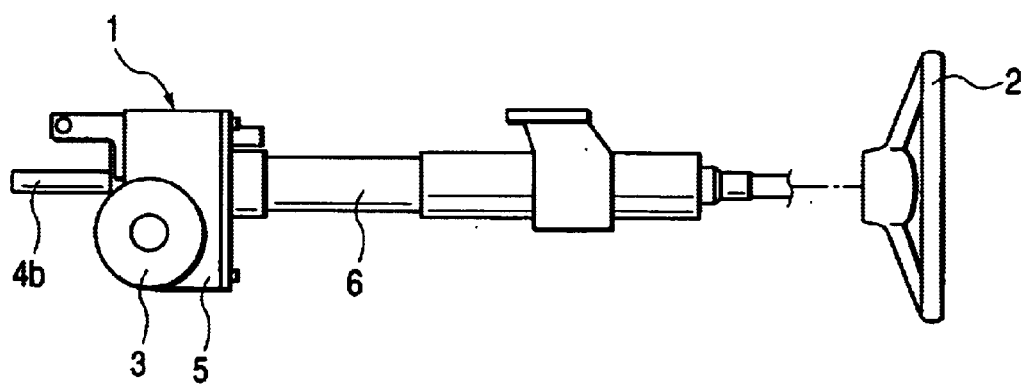
FIG. 3 is a side view which shows the electrically-powered steering device of FIG. 1 which is installed on a steering column.

Referring to the drawings, wherein like reference numbers refer to like parts in several views, particularly to FIGS. 1, 2, and 3, there is shown an electrically-powered steering device 1 according to the invention which may be employed in automotive vehicles.

The electrically-powered steering device 1, as clearly shown in FIG. 3, consists essentially of an electric motor 3, a torque transmission mechanism, a torque detector, and a controller. Structures of the torque transmission mechanism, the torque detector, and the controller will be described later in detail. The electric motor 3 works to produce torque for assisting a vehicle operator in rotating a steering wheel 2. The torque transmission mechanism works to transmit the output torque of the electric motor 3 to a steering shaft 4, as shown in FIG. 2. The torque detector works to measure the torque acting on the steering shaft 4 for steering the vehicle. The controller works to control an output of the electric motor 3 as a function of the torque measured by the torque detector. The torque transmission mechanism, the torque detector, and the controller are all installed within an outer casing 5 which is mounted on a steering column 6 together with the electric motor 3.

The steering shaft 4 is made up of an input shaft 4a linked to the steering wheel 2, an output shaft 4b joined to a steering mechanism (i.e., a rack and pinion mechanism) through a universal joint, not shown, and a torsion bar 7 connecting the shafts 4a and 4b together.

The input shaft 4a is disposed in the steering column 6 and has an end opposite the steering wheel 2 which is smaller in outer diameter and extends outside the steering column 6. The end is inserted into the output shaft 4b and held rotatably by a bearing 8.

The output shaft 4b is disposed coaxially with the input shaft 4a and joined to the input shaft 4a through the torsion bar 7 to be rotatable relative to the input shaft 4a.

The torsion bar 7 is inserted into inner chambers of the input and output shafts 4a and 4b and has ends joined to the input and output shafts 4a and 4b through pins 9 and 10. When the steering torque is transferred from the steering wheel 2 to the input shaft 4a, it will cause the torsion bar 7 to be twisted and the output shaft 4b to be rotated relative to the input shaft 4a.

The outer casing 5 is made of, for example, aluminum, installed from an axial direction of the steering shaft 4, and joined to an end of the steering column 6 through a sensor casing 11 disposed inside the outer casing 5.

The sensor casing 11 works to protect the torque detector against an external magnetic field along with the outer casing 5 and surrounds, as clearly shown in FIG. 1, the periphery of the torque detector disposed around the steering shaft 4.

The input shaft 4a is retained rotatably by the sensor casing 11 through a bearing 12. The output shaft 4b is retained rotatably by the sensor casing 11 and the outer casing 5 through bearings 13 and 14.

The electric motor 3 is a dc motor made up of a field having stationary magnetic poles, not shown, on an inner periphery of a yoke 15, an armature 16 disposed rotatably inside the field, and a brush 18 slidable in contact with a commutator 17 installed on the armature 16. The electric motor 3 is, as clearly shown in FIG. 2, mounted on the outer casing 5 using bolts, not shown, in abutment of an open end of the yoke 15 on a side wall of the outer casing 5.

The motor 3 has metallic motor terminals 20 connected electrically to the brush 18 through a pigtail 19. The motor terminals 20 are installed within a resinous holder plate 21 in insert molding.

The holder plate 21 is provided for holding a brush holder 22 which retains the brush 18 to be slidable and, as clearly shown in FIG. 2, installed in an open end of the yoke 15. The installation is achieved by inserting the holder plate 21 into the outer casing 5 through an opening formed in a side wall of the outer casing 5 when the motor 3 is mounted on the outer casing 5.

The motor terminals 20 are joined to the control substrate 23, as shown in FIG. 1, of the controller. The joining is achieved by bending the motor terminals 20 at right angles in an axial direction of the steering shaft 4 within the outer casing 5 after the motor 3 is installed on the outer casing 5.

The torque transmission mechanism works to decrease the speed of the armature 16 to increase the output torque of the motor 3 and transmit it to the output shaft 4b. The torque transmission mechanism is, as shown in FIG. 1, made up of a worm gear 24 mounted on a motor output shaft (i.e., an armature shaft not shown) and a warm wheel 25 installed on the output shaft 4b meshing with the warm gear 24.

The torque detector is made up of a magnet 26 installed on the input shaft 4a, a magnetic yoke 27 made of a soft magnetic substance installed on the output shaft 4b, a flux collecting ring 28 working to collect the magnetic flux from the magnetic yoke 27, and a magnetic sensor 29 working to measure the magnetic flux density in the flux collecting ring 28. The magnet 26 is made of a ring-shaped magnet which is disposed coaxially with the input shaft 4 and has S and N poles arrayed alternately in a circumferential direction thereof.

The magnetic yoke 27 is made of a pair of annular members which are arrayed coaxially with each other around the magnet 26 through a constant air gap. Each of the annular members has as many pole claws as the N poles or S poles of the magnet 26 arranged over the periphery thereof at regular intervals. The annular members are so shifted in the circumferential direction thereof that each of the pole claws of one of the annular members may be located between adjacent two of the pole claws of the other annular member.

The flux collecting ring 28 is, like the magnetic yoke 27, made of a pair of annular members disposed around the periphery of the magnetic yoke 27 in the close proximity thereto. The annular members have flat plate-like flux collecting portions (not shown) opposed to each other in the direction of a center line of the flux collecting ring 28 (i.e., the axial direction of the steering shaft 4).

The magnetic sensor 29 is disposed between the flux collecting portions of the flux collecting ring 28 and works to measure the density of magnetic flux produced between the flux collecting portions and convert it into an electric signal (e.g., a voltage signal). The magnetic sensor 29 may be implemented by a Hall IC. The magnetic sensor 29 is retained by the sensor casing 11 and has terminals 30 which are, as clearly shown in FIG. 1, bent at right angles toward the steering wheel 2 and connect electrically with the control substrate 23 electrically.

The controller is made up of the control substrate 23, a microcomputer and electrolytic capacitors mounted on the control substrate 23, and a drive device 31 working to control the current to be supplied to the motor 3.

The control substrate 23, as can be seen from FIG. 2, has a rectangular plate portion and a semi-circular plate portion. The semi-circular plate portion has formed in its center a circular hole 23a through which the input shaft 4a passes. The control substrate 23 has formed therein a plurality of through holes 23b for electrical connections.

The drive device 31 is made up of, for example, MOS-FETs which are fixed using screws on the outer casing 5 through a metal substrate whose surface is coated with a thermal conductive insulating material for facilitating thermal dissipation and have terminals 32, as clearly shown in FIG. 1, extending from a side thereof. Each of the terminals 32 is bent at right angles toward the steering wheel 2 and connects with the control substrate 23.

The control substrate 23 also has disposed thereon, as shown in FIG. 2, a power relay 33 working to cut the supply of power to the motor 3, a power connector 34 for connection with a battery installed in the vehicle, and communication connector 35 for receiving signals indicative of the speeds of the vehicle and the engine. The installation of the control substrate 23 is achieved by passing the input shaft 4a through the hole 23a of the control substrate 23 from the side of the steering wheel 2 and securing the control substrate 23 on an inner wall of the outer casing 5 using screws.

Assembling steps of the electrically-powered steering device 1 will be described below.

First, the outer casing 5 is attached to the steering shaft 4 from the axial direction of the steering shaft 4. Before the attachment of the outer casing 5 to the steering shaft 4, the magnet 26 and the magnetic yoke 27 of the torque detector are secured on the input and output shafts 4a and 4b. The drive device 31 is also installed in the outer casing 5 with the terminals 32 bent at right angles.

Next, the motor 3 is attached to the outer casing 5 and secured using bolts. Portions of the motor terminals 20 extending to the outer casing 5 from the holder plate 21 are bent at right angles.

Subsequently, the sensor casing 11 on which the flux collecting ring 28 and the magnetic sensor 29 are installed is placed within the outer casing 5. The terminals 30 of the magnetic sensor 29 are bent at right angles. The bending may alternatively be made before the installation of the sensor casing 11. The installation of the sensor casing 11 may alternatively be made before the installation of the motor 3.

The control substrate 23 is installed from the side of the steering wheel 2 in the axial direction of the steering shaft 4. Specifically, the input shaft 4a is inserted into the hole 23a of the control substrate 23 from the side of the steering wheel 2. The boss 11a, as shown in FIG. 1, of the sensor casing 11 is inserted into the hole 23a to place the control substrate 23 inside the outer casing 5. The motor terminals 20, the terminals 30 of the magnetic sensor 29, and the terminals 32 of the drive device 31 are inserted into the through holes 23b of the control substrate 23 to the side of the steering wheel 2.

The control substrate 23 disposed within the outer casing 5 is positioned on a step 11b formed on the sensor casing 11 and secured on the outer casing 5 using screws.

Subsequently, ends of the terminals 20, 30, and 32 projecting from the control substrate 23 to the side of the steering wheel 2 are soldered electrically to the control substrate 23.

Finally, the cover 36 is fitted on the open end of the outer casing 5 and secured by staking or using bolts. The power connector 34 and the communication connector 35 are exposed outside the cover 36 through openings.

As apparent from the above discussion, the control substrate 23 is incorporated in the electrically-powered steering device 1 with the hole 23a through which the steering shaft 4 passes, thereby allowing all the terminals 20, 30, and 32 to be connected electrically to the control substrate 23 from the same side in the axial direction (i.e., a lengthwise direction) of the sheering shaft 4, thus facilitating ease of the electrical connection between the control substrate 23 and each of the terminals 20, 30, and 32. This results in reduction in manufacturing cost and improved productability of the electrically-powered steering device 1.

The torque detector is disposed around the sheering shaft 4 in close proximity thereto. The sensor casing 11 and the outer casing 5 constitute a double-walled structure which surrounds the periphery of the torque detector, thereby decreasing adverse effects of an external magnetic field on the torque detector causing an error in operation of the torque detector.

The torque transmission mechanism is, as described above, made up of a combination of the warm gear 24 and the worm wheel 25, but may alternatively be implemented by a speed reduction gear device using a hypoid gear, for example.

Figure 5:
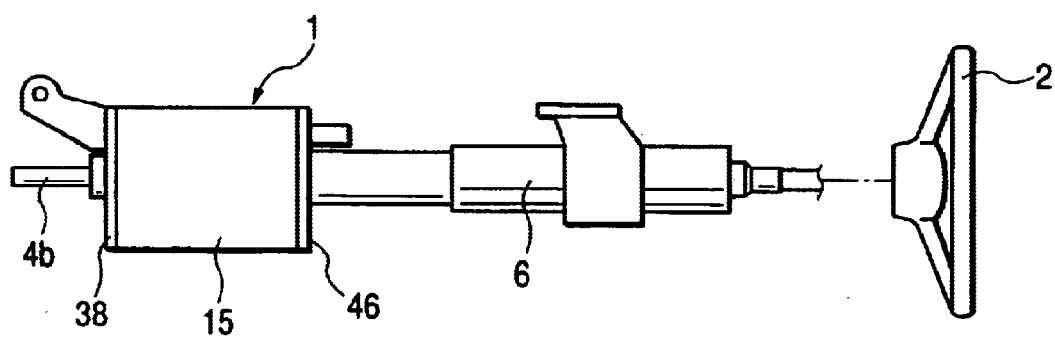
FIG. 5 is a side view which shows the electrically-powered steering device of FIG. 4 which is installed on a steering column.
Figure 4:
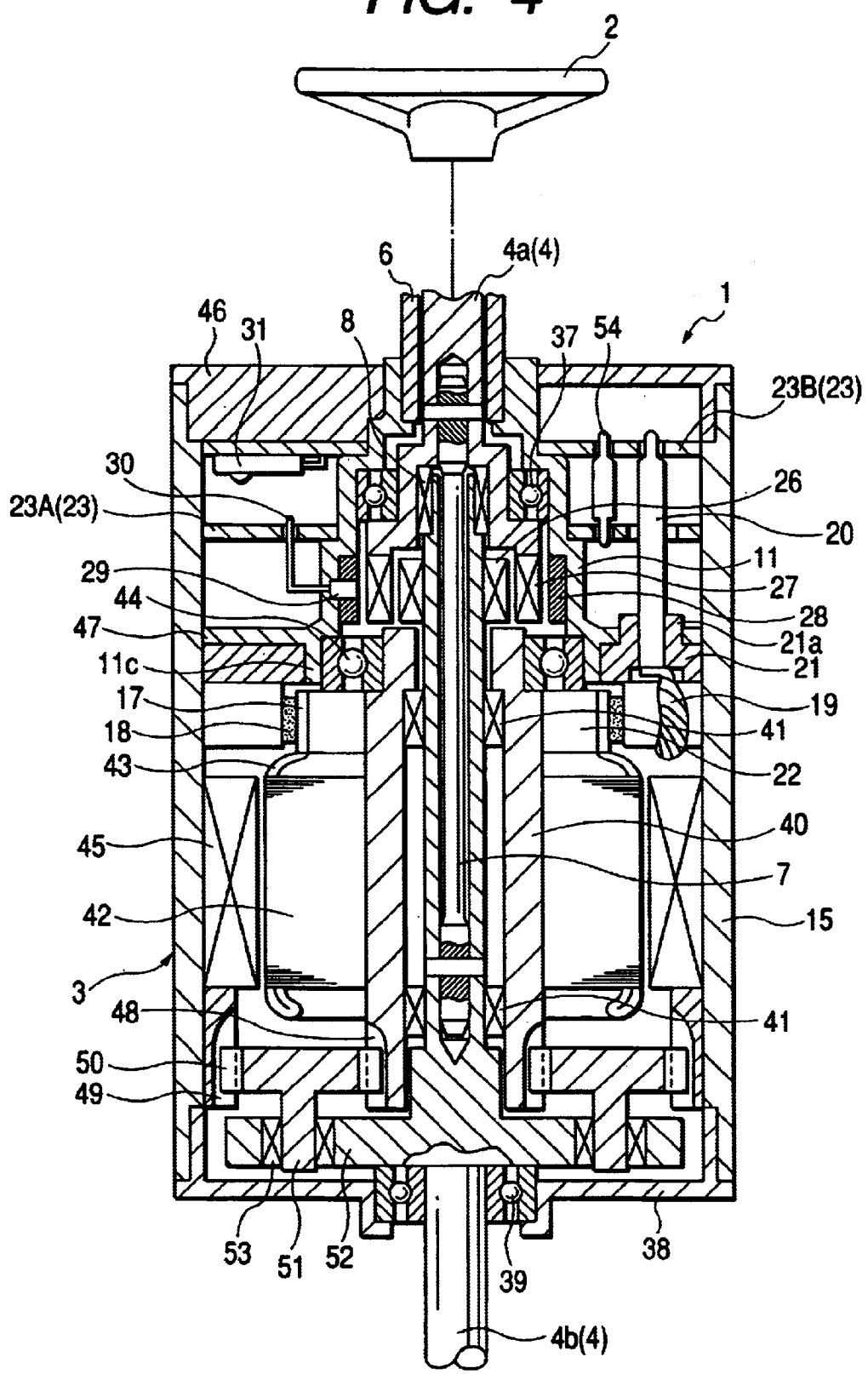
FIG. 4 is a longitudinal sectional view which shows an electrically-powered steering device according to the second embodiment of the invention.

FIG. 4 illustrates an internal structure of the electrically-powered steering device 1 according to the second embodiment of the invention. FIG. 5 illustrates the electrically-powered steering device 1 installed on the steering column 6. The electrically-powered steering device 1 is so designed as to have the motor 3, the torque transmission mechanism, the torque detector, and the controller disposed coaxially with the steering shaft 4. The same reference numbers as employed in the first embodiment will refer to the same parts, and explanation thereof in detail will be omitted here.

The steering shaft 4 is, like the first embodiment, made up of the input shaft 4a, the output shaft 4b, and the torsion bar 7 joining the input and output shafts 4a and 4b together.

The input shaft 4a is carried rotatably by the sensor casing 11 through a bearing 37. The output shaft 4b is carried rotatably by an output cover 38 through a bearing 39. The input shaft 4a and the output shaft 4b are disposed in alignment with each other through the bearing 8.

The motor 3 is installed coaxially with the output shaft 4b inserted into a hollow cylindrical armature shaft 40 and carried rotatably by the output shaft 4b through a pair of bearings 41.

An armature core 42 made of a laminate of thin steel plates is press fit within the armature shaft 40. A coil 43 is wound around the armature core 42. The commutator 17 connecting electrically to the coil 43 is disposed around the periphery of the armature shaft 40. The armature shaft 40 is supported by the sensor casing 11 through a bearing 44 at an end thereof facing the steering wheel 2.

A plurality of permanent magnets 45 are secured on an inner wall of the yoke 15 so as to surround the armature core 42. The permanent magnets 45 have N poles and S poles which are arrayed alternately in a circumferential direction of the yoke 15.

The yoke 15 extends in an axial direction (i.e., a lengthwise direction) of the steering shaft 4 and serves as an outer casing within which the torque transmission mechanism, the torque detector, and the controller are disposed. An input cover 46 which is made of a metallic material such as aluminum is fitted in an open end of the yoke 15 through a faucet joint. The output cover 38 is fitted in the other open end of the yoke 15 through a faucet joint.

The brush 18 is in contact with an outer periphery of the commutator 17 and retained by a brush holder 22 secured on the holder plate 21 to be slidable in a radius direction of the motor 3. The brush 18 is urged elastically by a brush spring, not shown, into constant engagement with the surface of the commutator 17.

The holder plate 21 is made of an annular member and fitted on an outer surface of a bearing wall 11c in contact with a surface of a partition 47 facing the motor 3. The bearing wall 11c and the partition 47 are formed integrally with the sensor casing 11. The holder plate 21 has a plurality of protrusions 21a arrayed in a circumferential direction. Each of the protrusions 21a projects from one of holes formed in the partition 47 toward the steering wheel 2.

The metallic motor terminals 20 are incorporated within the holder plate 21 by insert molding which connect electrically with the brush 18 through the pigtail 19. The motor terminals 20 extend through the protrusions 21a of the holder plate 21 in the axial direction of the steering shaft 4 and connect with a control substrate assenbly 23, as will be described later in detail.

The torque transmission mechanism is implemented by a planetary gear speed reduction mechanism consisting of a sun gear 48 formed on the end of the armature shaft 40, an internal gear 49 which is disposed outside the sun gear 48 in a radius direction of the sun gear 48 and secured on the inner wall of the yoke 15, and planetary gears 50 meshing with the sun gear 48 and the internal gear 49. Each of the planetary gears 50 has a central spindle 51 formed integrally which is carried rotatably by a large-diameter planet carrier 52 formed integrally with the output shaft 4b.

In an operation of the planetary gear speed reduction mechanism, when the armature shaft 40 rotates, the planetary gears 50 revolve round the sun gear 48 in mesh with the sun gear 48 and the internal gear 49 to rotate the output shaft 4b at a reduced speed of the armature shaft 40.

The torque detector is, like the first embodiment, made up of the magnet 26 installed on the output shaft 4b, the magnetic yoke 27 made of a soft magnetic material, installed on the input shaft 4a, the flux collecting ring 28 working to collect the magnetic flux from the magnetic yoke 27, and the magnetic sensor 29 made of, for example, a Hall IC, working to measure the magnetic flux density in the flux collecting ring 28.

The magnetic sensor 29 is installed in the sensor casing 11 and has the terminals 30 which extend in the radius direction of the sensor casing 11, are bent at right angles toward the steering wheel 2, and joined electrically to the control substrate assembly 23 of the controller.

The control substrate assembly 23 of the controller consists of two substrates: a first control substrate 23A and a second control substrate 23B. The first and second control substrates 23A and 23B are fitted on the periphery of the sensor casing 11 and extend perpendicular to the length of the steering shaft 4. The first and second control substrates 23A and 23B are arrayed at a given interval away from each other in the lengthwise direction of the steering shaft 4.

To the first control substrate 23A, the terminals 30 of the magnetic sensor 29 are soldered electrically. The first and second control substrates 23A and 23B are connected electrically through terminals 54.

To the second control substrate 23B, the motor terminals 20 are soldered electrically. The drive device 31 made of, for example, MOSFETs is fabricated electrically on the second control substrate 23B. The second control substrate 23B has a connector (not shown) installed thereon for electrical connection to an external device.

The second control substrate 23B is made of a metal plate coated with an insulating material and is attached directly to a surface of the input cover 46 opposed to the drive device 31.

As apparent from the above discussion, the first and second control substrates 23A and 23B are incorporated in the electrically-powered steering device 1 so as to extend perpendicular to the steering shaft 4, thereby allowing all the terminals 20, 30, and 32 to be connected electrically to the control substrates 23A and 23B from the same side in the axial direction of the sheering shaft 4, thus facilitating ease of the electrical connection between the control substrates 23A and 23B and the terminals 20, 30, and 32. This results in reduction in manufacturing cost and improved productability of the electrically-powered steering device 1.

The torque detector is, like the first embodiment, disposed around the sheering shaft 4 in close proximity thereto. The sensor casing 11 and the outer casing 5 form a double-walled structure which surrounds the periphery of the torque detector, thereby decreasing adverse effects of an external magnetic field on the torque detector causing an error in operation of the torque detector.

The motor 3, the torque transmission mechanism, the torque detector, and the controller are arranged coaxially with the steering shaft 4, so that the motor 3 is installed without projecting in the radius direction of the steering shaft 4, thus resulting in a compact structure of the electrically-powered steering device 1, as shown in FIG. 5, which improves the mountability of the electrically-powered steering device 1 on vehicles.

The above coaxial arrangement also permits the electrically-powered steering device 1 to be rotated around the steering shaft 4 and installed in the vehicle at a desired circumferential position thereof. This also allows connectors to be installed on an outer wall of the input cover 46 at desired positions.

Figure 6:
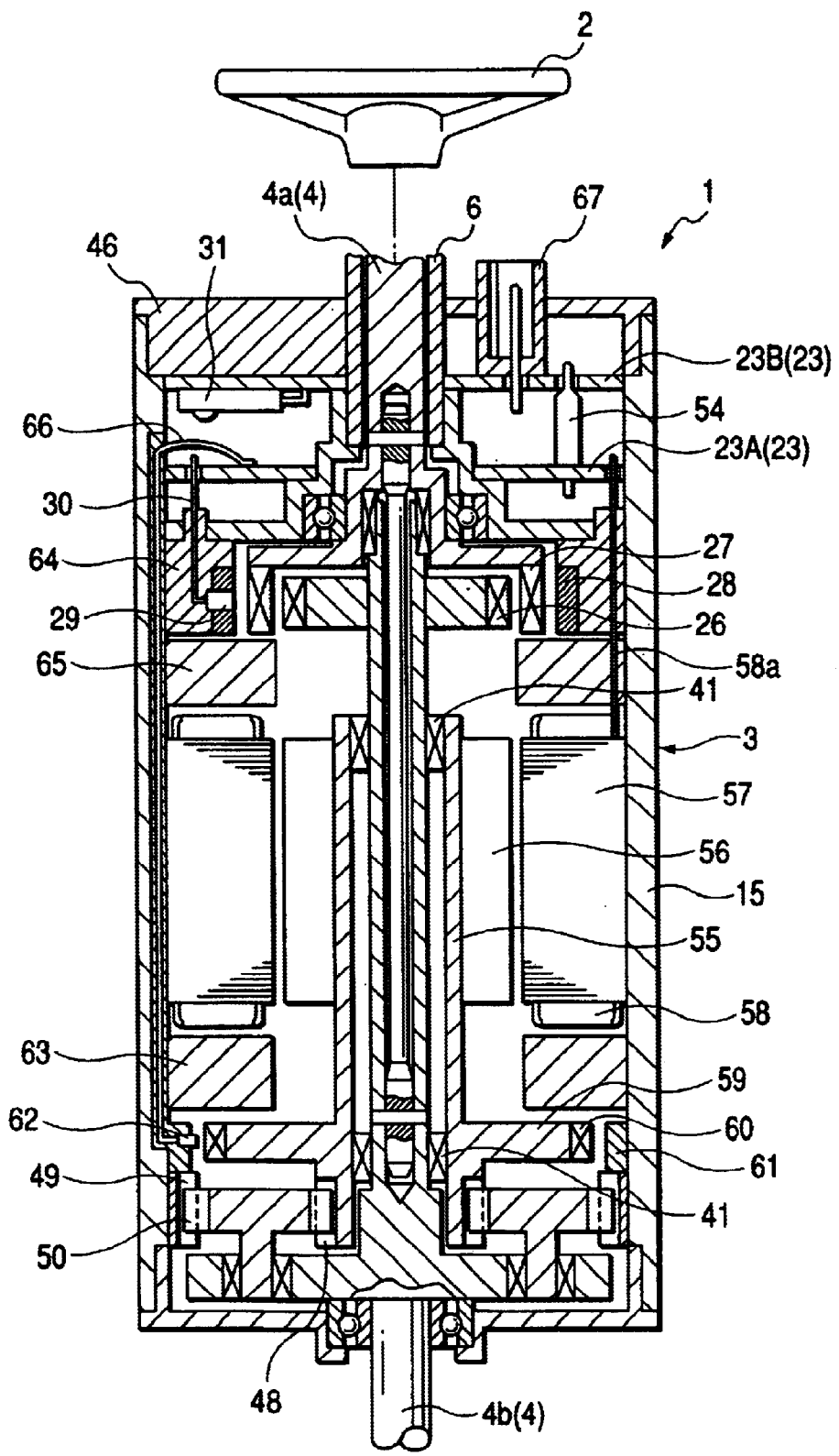
FIG. 6 is a longitudinal sectional view which shows an electrically-powered steering device according to the third embodiment of the invention.

FIG. 6 illustrates the electrically-powered steering device 1 according to the third embodiment of the invention. The electrically-powered steering device 1 is, like the second embodiment, so designed as to have the motor 3, the torque transmission mechanism, the torque detector, and the controller disposed coaxially with the steering shaft 4, but different from the second embodiment in that the motor 3 is a brushless motor. The same reference numbers as employed in the first and second embodiment will refer to the same parts, and explanation thereof in detail will be omitted here.

The motor 3 is made up of a field working as a rotor and an armature working as a stator. Specifically, rotor magnets 56 are secured on the periphery of a rotary shaft 55 so that N poles and S poles may be arrayed alternately in a circumferential direction of the rotary shaft 55, thereby forming the field. A laminated core 57 is secured on an inner wall of the yoke 15. A coil 58 is wound around the core 57 to form the armature. Leads 58a of the coil 58 extend in the axial direction of the steering shaft 4 and connect electrically with the control substrate assembly 23.

The rotary shaft 55 is, like the armature shaft 40 of the second embodiment, made of a hollow cylindrical member into which the output shaft 4b is inserted coaxially. The rotary shaft 55 is installed on the output shaft 4b through a pair of bearings 41 to be rotatable relative to the output shaft 4b.

The motor 3 is a brushless motor which is designed to produce a magnetic filed upon supply of current to the coil 58, thereby developing magnetic attraction to the rotor magnets 56 so that they rotate together with the rotary shaft 55.

The rotary shaft 55 has a flange 59 formed integrally thereon. Magnets 60 are installed on the periphery of the flange 59 which have N poles and S poles arrayed alternately in a circumferential direction of the flange 59. A resinous hollow cylindrical bush 61 is secured on the inner wall of the yoke 15 so as to surround the magnets 60. A Hall IC 62 is installed in the bush 61 which works as an angular sensor along with the magnets 60 to measure an angular position of the rotary shaft 55.

A non-magnetic ring 63 is secured on the inner wall of the yoke 15 between the Hall IC 62 and the coil 58 in order to minimize adverse effects of a magnetic field produced by the rotor magnets 56 on the Hall IC 62.

The torque transmission mechanism is, like the second embodiment, made up of the sun gear 48, the internal gear 49, and the planetary gears 50 meshing with the sun gear 48 and the internal gear 49 and works to decrease the speed of the rotary shaft 55 and transmit it to the output shaft 4b.

The torque detector is, like the second embodiment, made up of the magnet 26 installed on the output shaft 4b, the magnetic yoke 27 made of a soft magnetic material, installed on the input shaft 4a, the flux collecting ring 28 working to collect the magnetic flux from the magnetic yoke 27, and the magnetic sensor 29 made of, for example, a Hall IC, working to measure the magnetic flux density in the flux collecting ring 28.

The flux correcting ring 28 and the magnetic sensor 29 are installed in a resinous bush 64 through insert molding. The bush 64 is press fit within the yoke 15.

A non-magnetic ring 65 is secured on the inner wall of the yoke 15 between the magnetic sensor 29 and the coil 58 in order to minimize adverse effects of the magnetic field produced by the rotor magnets 56 on the magnetic sensor 29.

The control substrate assembly 23 of the controller, like the second embodiment, consists of the first control substrate 23A and the second control substrate 23B. The first and second control substrates 23A and 23B are secured on the inner peripheral wall of the yoke 15 and extend perpendicular to the length of the steering shaft 4. The first and second control substrates 23A and 23B are arrayed at a given interval away from each other in the lengthwise direction of the steering shaft 4.

To the first control substrate 23A, the terminals 30 of the magnetic sensor 29 are soldered electrically. Electrical lines 66 extending from the Hall IC 62 in the axial direction of the steering shaft 4 connect electrically with the first control substrate 23A. Additionally, leads 58a of the coil 58 installed on the laminated core 57 of the motor 3 connect electrically with the first control substrate 23A.

On the second control substrate 23B, the drive device 31 made of, for example, MOSFETs is, like the second embodiment, fabricated electrically. The second control substrate 23B has a connector 67 installed thereon for electrical connection to a battery or an external communication device.

The first and second control substrates 23A and 23B are connected electrically through the terminals 54.

As apparent from the above discussion, the first and second control substrates 23A and 23B are incorporated in the electrically-powered steering device 1 so as to extend perpendicular to the steering shaft 4, thereby allowing all the terminals to be connected electrically to the control substrates 23A and 23B from the same side in the axial direction of the sheering shaft 4, thus facilitating ease of the electrical connection between the control substrates 23A and 23B and the terminals. This results in reduction in manufacturing cost and improved productability of the electrically-powered steering device 1.

The torque detector is surrounded by the bush 64. The bush 64 is surrounded by the yoke 15. This decreases adverse effects of an external magnetic field on the torque detector causing an error in operation of the torque detector.

The non-magnetic rings 63 and 65 are disposed outside the armature to minimize the adverse effects of the magnetic field produced by the rotor magnets 56 on the Hall IC 62 and the magnetic sensor 29, thus avoiding errors in detection of the Hall IC 62 and the magnetic sensor 29.

The motor 3, the torque transmission mechanism, the torque detector, and the controller are arranged coaxially with the steering shaft 4, so that the motor 3 is installed without projecting in the radius direction of the steering shaft 4, thus resulting in a compact structure of the electrically-powered steering device 1 and also allowing the connector 67 to be installed in the input cover 46 at desired position.

The torque transmission mechanism in each of the first and second embodiments may alternatively be implemented by a wave gear speed reduction mechanism instead of the planetary gear speed reduction mechanism.

Figure 7:
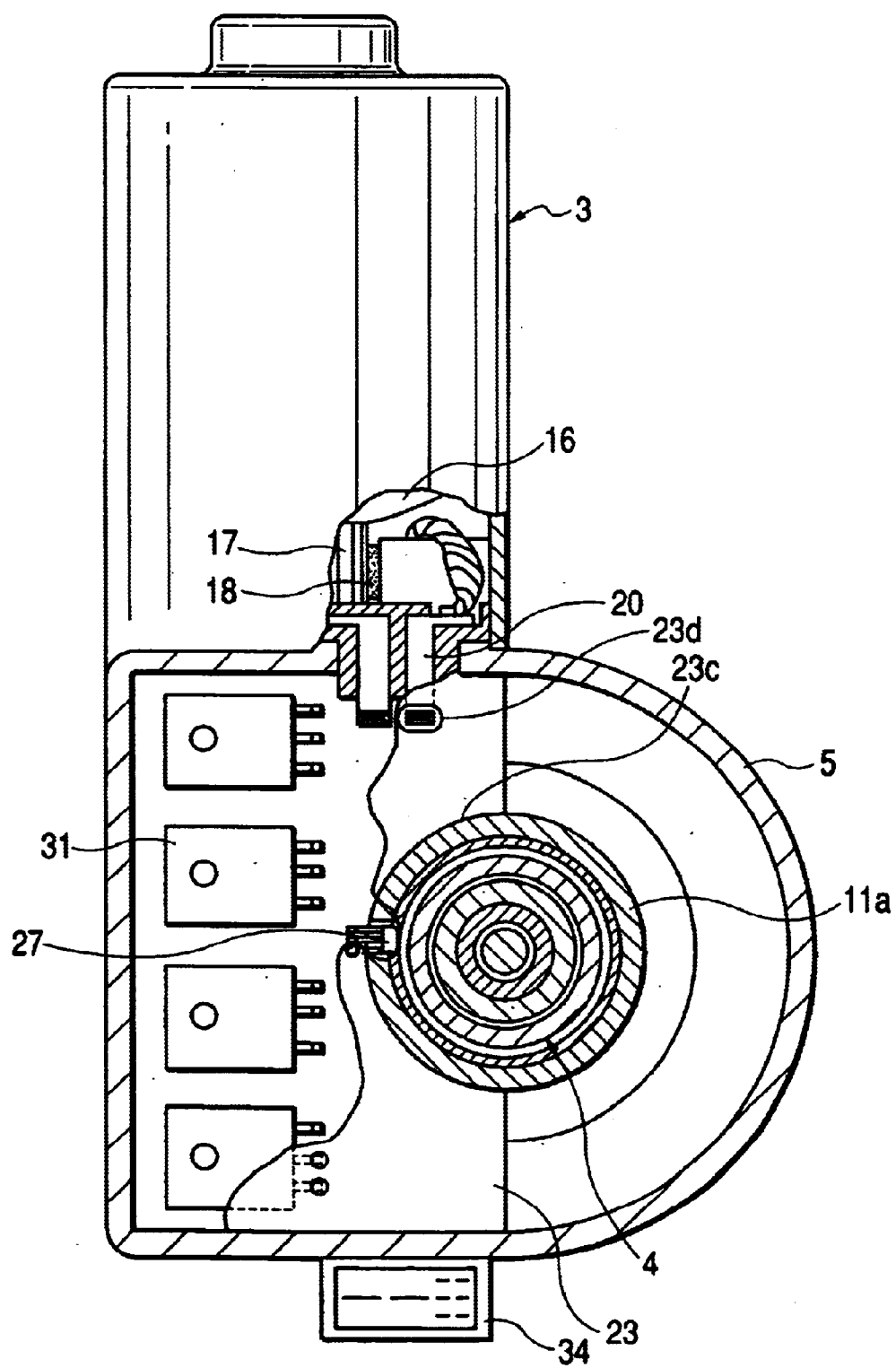
FIG. 7 is a partially transverse sectional view which shows an terminal joint structure of an electrically-powered steering device according to the fourth embodiment of the invention.

FIG. 7 illustrates an internal structure of the electrically-powered steering device 1, as viewed from the radius direction thereof, according to the fourth embodiment of the invention. The electrically-powered steering device 1 is designed to have a decreased surface area of the control substrate 23.

In a case where it is possible to decrease the surface area of the control substrate 23 because the size of electric parts to be mounted on the control substrate 23 is small, the control substrate 23 may be, as shown in the drawing, made of a rectangular plate. This results in an increase in production yield of the control substrate 23 as compared with the one shown in FIG. 2 consisting of the rectangular plate portion and the semi-circular plate portion.

The control substrate 23 has a semi-circular hole 23c through which a half of the steering shaft 4 in the radius direction thereof passes.

Figure 8:
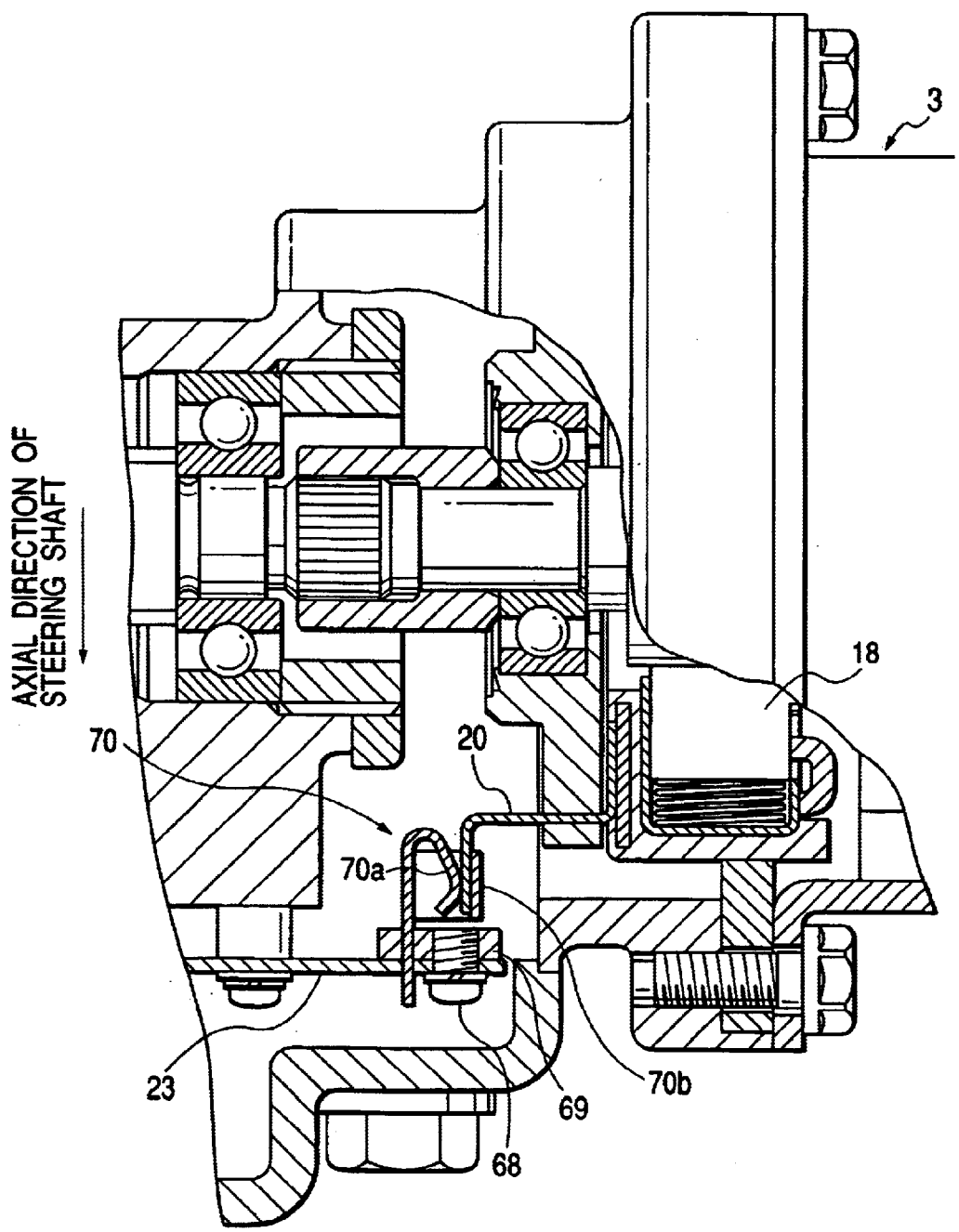
FIG. 8 is a partially cutaway view which shows an terminal joint structure of an electrically-powered steering device according to the fifth embodiment of the invention.

FIG. 8 illustrates a connection structure of the electrically-powered steering device 1 according to the fifth embodiment of the invention which establishes electrical connections of the motor terminals 20 to the control substrate 23.

Two plus and minus female terminals 70 are provided integrally with a resinous terminal holder 69. The terminal holder 69 is secured on the control substrate 23 using screws 68. The motor terminals 20 (i.e., male terminals) are plugged into the female terminals 70 from the axial direction of the steering shaft 4 to make electric connections of the motor terminals 70 to the control substrate 23.

Each of the female terminals 70 has a square receptacle within which an elastically deformable curved strip 70a is disposed. The motor terminal 20 is plugged between the curved strip 70a and a contact strip 70b of the receptacle, so that the motor terminal 20 is elastically urged by the curved strip 70a into electrical contact with the contact strip 70b.

Figure 9:
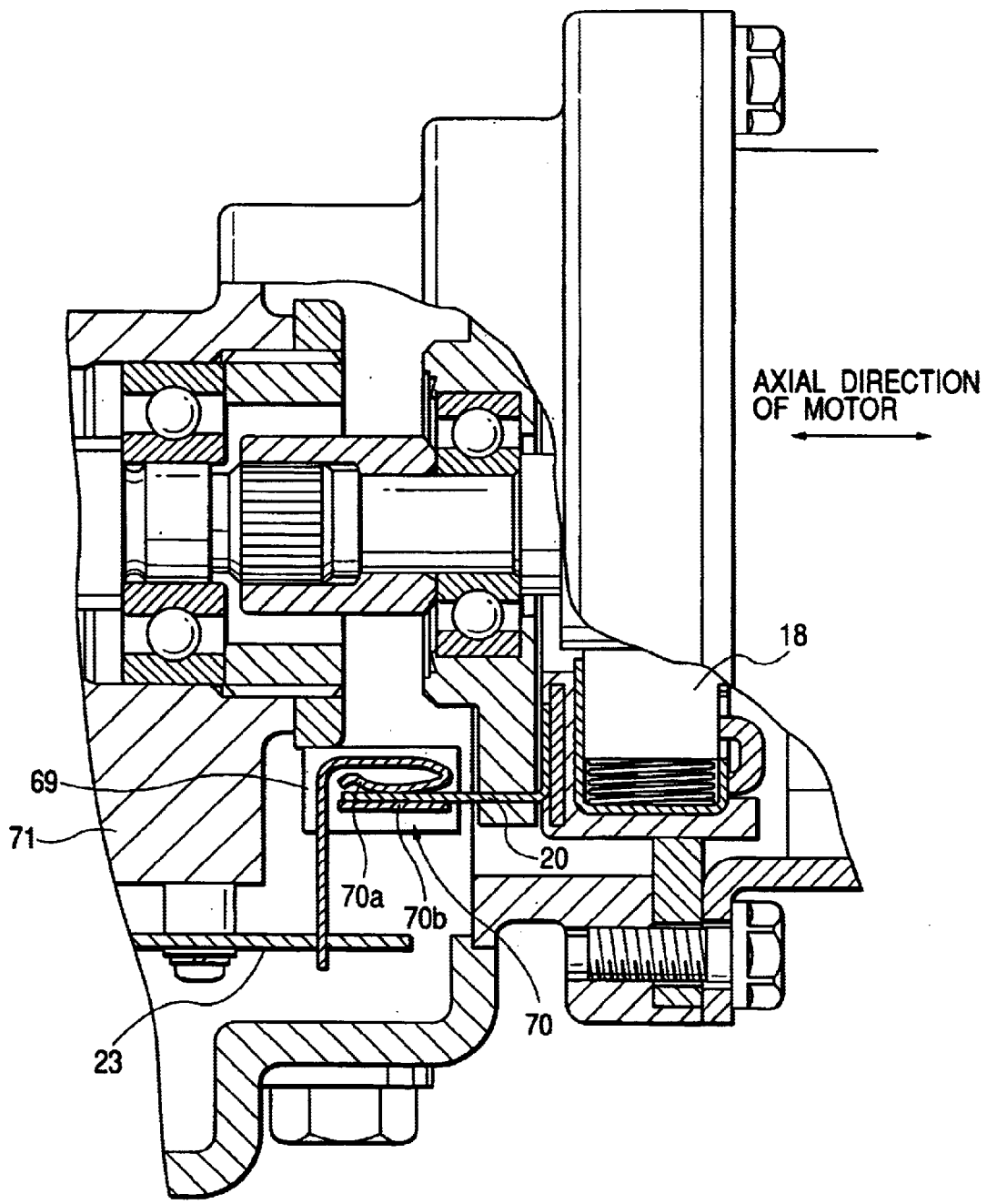
FIG. 9 is a partially cutaway view which shows an terminal joint structure of an electrically-powered steering device according to the sixth embodiment of the invention.

FIG. 9 shows a connection structure of the electrically-powered steering device 1 according to the sixth embodiment of the invention which establishes electrical connections of the motor terminals 20 to the control substrate 23. The connection structure of this embodiment is a modification of the one shown in FIG. 8 and designed to joint the motor terminals 20 to the female terminals 70 from the axial direction of the motor 3 (i.e., the lateral direction in the drawing).

The terminal holder 69 holding the female terminals 70 is secured on the housing 71 using screws (not shown).

In the fifth and sixth embodiments, a similar connection structure may also be used for electrical connections of the terminals 30 of the magnetic sensor 29 and the terminals 32 of the drive device 31 to the control substrate 23.

The motor terminals 20 are, as described above, made of the male terminals, while the terminals 70 leading to the control substrate 23 are made of the female terminals, but however, they may alternatively be designed to have a reverse relation. Specifically, the motor terminals 20 may have the same structure as the female terminals 70, while the male terminals may be installed on the control substrate 23.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An electrically-powered steering device comprising:
   a motor working to produce torque for assisting in turning a steering wheel;
   a torque transmission mechanism working to transmit the torque outputted by said motor to a steering shaft connecting with the steering wheel;
   a torque detector working to measure torque acting on the steering shaft; and
   a controller working to control an output of said motor as a function of the torque measured by said torque detector,
   wherein said motor, said torque transmission mechanism, said torque detector, and said controller are arranged integrally as a unit,
   wherein said controller includes a motor driver working to control an exciting current supplied to said motor and a control substrate to which terminals of the motor driver are connected electrically, the control substrate being installed so that the steering shaft passes through a portion of the control substrate,
   and wherein power terminals of said motor, terminals of said torque detector, and terminals of said motor driver extend in an axial direction of the steering shaft and connect electrically to the control substrate from the same side.

2. An electrically-powered steering device as set forth in claim 1, wherein said motor, said torque transmission mechanism, said torque detector, and said controller are constructed coaxially with the steering shaft.

3. An electrically-powered steering device as set forth in claim 1, wherein said torque transmission mechanism is implemented by a speed reduction gear mechanism using one of a worm gear and a hypoid gear.

4. An electrically-powered steering device as set forth in claim 2, wherein said torque transmission mechanism is implemented by one of a planetary gear speed reduction mechanism and a wave gear speed reduction mechanism.

5. An electrically-powered steering device as set forth in claim 1, wherein said torque detector is made up of a magnet and a magnetic sensor.

6. An electrically-powered steering device as set forth in claim 5, wherein said torque detector is disposed in close proximity to a periphery of the steering shaft.

* * * * *